United States Patent [19]

Herr

[11] 4,404,488
[45] Sep. 13, 1983

[54] BRUSH BOARD ASSEMBLY FOR DYNAMOELECTRIC MACHINE

[75] Inventor: John A. Herr, Garwood, N.J.

[73] Assignee: The Singer Company, Stamford, Conn.

[21] Appl. No.: 338,932

[22] Filed: Jan. 12, 1982

[51] Int. Cl.³ .......................................... H02K 13/00
[52] U.S. Cl. ................................ 310/239; 310/68 R; 310/72; 310/241
[58] Field of Search ................... 310/68 R, 68 D, 72, 310/42, 239–242, 244–247, 220, 221, 222, 43; 318/360, 361, 541, 542

[56] References Cited

U.S. PATENT DOCUMENTS

| | | | |
|---|---|---|---|
| 3,194,994 | 7/1965 | Latta | 310/68 R |
| 3,223,862 | 12/1965 | Webb | 310/68 R |
| 3,271,601 | 9/1966 | Raver | 310/68 R |
| 3,739,205 | 6/1973 | Winkelmann | 310/242 |
| 3,791,684 | 2/1974 | Hamman | 310/159 |
| 3,891,876 | 6/1975 | Herr et al. | 310/43 |
| 3,924,147 | 12/1975 | Tarnow | 310/239 |
| 4,049,984 | 9/1977 | Ishii et al. | 310/241 |
| 4,063,123 | 12/1977 | Herr et al. | 310/233 |
| 4,232,238 | 11/1980 | Saito | 310/68 D |
| 4,329,605 | 5/1982 | Angi | 310/68 R |

*Primary Examiner*—R. Skudy
*Attorney, Agent, or Firm*—William V. Ebs; Robert E. Smith; Edward L. Bell

[57] ABSTRACT

A brush board assembly for a dynamoelectric machine is provided with flexible electrically conductive brush carrying flat springs which are pinned to a ring-like mounting board in a manner effective to electrically connect the spring to printed circuitry on the board.

3 Claims, 5 Drawing Figures

BRUSH BOARD ASSEMBLY FOR DYNAMOELECTRIC MACHINE

BACKGROUND OF THE INVENTION

1. Field of the Invention

The invention relates to brush board assemblies for dynamoelectric machines. More particularly, the invention is directed to an improved arrangement for mounting brushes on a supporting board and biasing said brushes in a radial direction into engagment with the commutator of a dynamoelectric machine.

2. Description of the Prior Art

The brushes of a dynamoelectric machine are generally slidably contained within brush holders and biased radially by springs into engagement with a commutator. It has been a common practice to mount the brushes, the brush holders and springs on a board to provide an assembly securable as a unit in the machine. An example of such an assembly may be seen, for example, in U.S. Pat. No. 3,739,205 of Herbert E. Winkelmann for "Brush and Spring Holder Assembly" issued June 12, 1973. Such assemblies have been expensive to produce by reason of the nature of the parts employed in their construction, the manner in which the parts were assembled, and the manner in which electrical connections were made on the structure.

It is a prime object of the present invention to provide a low cost brush board assembly not requiring the use of brush containers or electrical leads extending to brushes.

It is another object of the invention to provide a low cost brush board assembly as described having printed circuitry thereon which connects with electrically conductive brush biasing springs.

Other objects and advantages of the invention will become apparent during a reading of the specification taken in connection with the accompanying drawings.

SUMMARY OF THE INVENTION

In accordance with the invention, a dynamoelectric machine is provided with a brush board assembly comprising a mounting board which is preferably formed as a ring to extend around a commutator, electrically conductive flat springs, a commutator engagable brush cemented into a pierced cavity in each spring with an electrically conductive epoxy cement, and printed circuitry on the ring. The ring includes inwardly projecting portions with holes which pass through the printed circuitry. The inwardly projecting ring portions extend through slots in the springs and electrically conductive roll pins are received in the holes to secure the springs to the ring.

DESCRIPTION OF THE PREFERRED EMBODIMENT OF THE INVENTION

Figure 1:
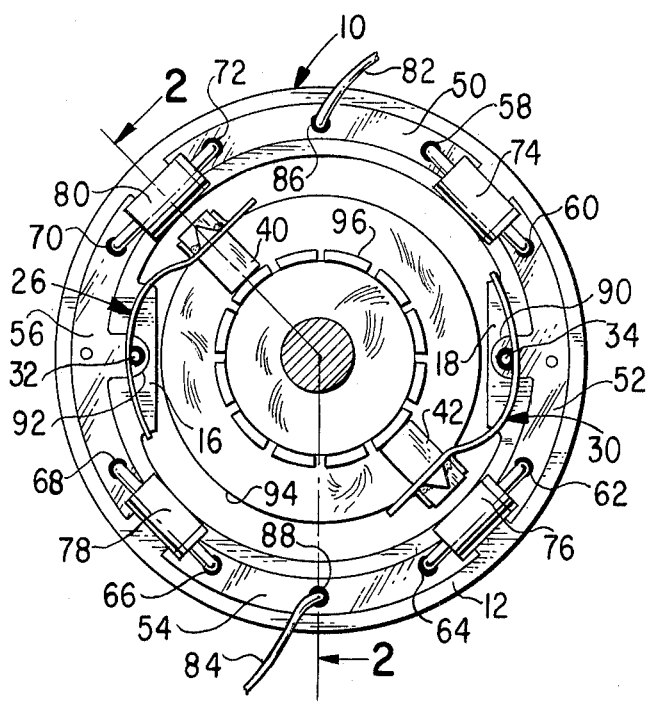
FIG. 1 is a fragmentary front elevational view of a dynamoelectric machine from which the housing has been removed to show the brush board assembly of the invention.

Referring to the drawings, reference character 10 designates a brush board assembly according to the invention including a mounting board 12 of an electrically non-conductive material which is preferably plastic and therefor easily formed. The board is formed to extend about a commutator 14 and preferably is configured in the manner shown, that is, as a circular ring. The board includes diametrically opposite inwardly projecting portions 16 and 18 with through circular holes 20 and 22 respectively. Inwardly projecting portion 16 of the board extends through a slot 24 in a flat elongate electrically conductive metal spring 26, and inwardly projecting portion 18 extends through a slot 28 in a like flat elongate spring 30. A cylindrical pin 32 extending through hole 20 and in tight fitting engagement with spring 26 secures the spring 26 on the board. Similarly, a cylindrical pin 34 extending through hole 22 and in tight fitting engagement with spring 30 secures the spring 30 on the board.

Figure 4:
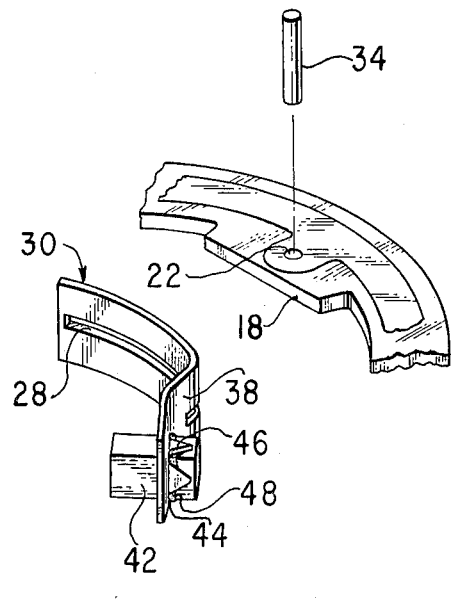
FIG. 4 is an enlarged fragmentary perspective view illustrating the manner in which a brush is attached to a spring in the brush board assembly.

The springs 26 and 30 include parallel free arm portions 36 and 38 respectively which carry conductive brushes 40 and 42 of carbon or other suitable material at diametrically opposite locations in the mounting board ring 12. Free arm portion 36 of spring 26 carries brush 40 and free arm portion 38 of spring 30 carries brush 42. Each brush is secured in a like manner on the spring arm portion with which it is associated. As shown for brush 42 in FIG. 4, one end of the brush is fitted into a pierced hole 44 in spring portion 38. The hole 44 is so formed as to leave jagged metal portions 46 of the spring surrounding the hole and the brush is cemented to such metal portions 46 of the spring with an electrically conductive epoxy cement 48.

As shown, the mounting board 12 has arcuate printed circuit segments 50, 52, 54 and 56 thereon. End terminals 58–60, 62–64, 66–68 and 70–72 of such segments are interconnected by diode rectifiers 74, 76, 78 and 80 respectively. Leads 82 and 84 connect with the printed circuitry at intermediate terminals 86 and 88 respectively in segments 50 and 54. Holes 20 and 22 in the inwardly projecting portions of the mounting board ring 12 extend through portions 90 and 92 in printed circuit segments 52 and 56 respectively. As noted hereinbefore, pins 32 and 34 extend through holes 20 and 22 respectively in the mounting board. These pins are of an electrically conductive material. Pin 32 in hole 20 electrically connects with printed circuit segment 56 and spring 26, and pin 34 in hole 22 electrically connects with printed circuit segment 52 and spring 30. The pins 32 and 34 are preferably soldered to circuit segments 56 and 52 respectively.

Figure 2:
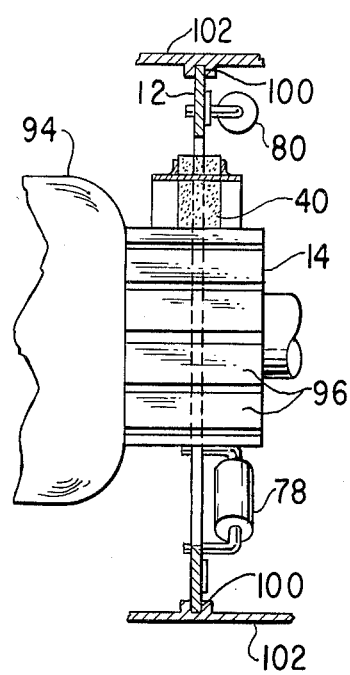
FIG. 2 is a fragmentary side view of said machine with portions shown in section on the plane of the line 2—2 of FIG. 1.
Figure 3:
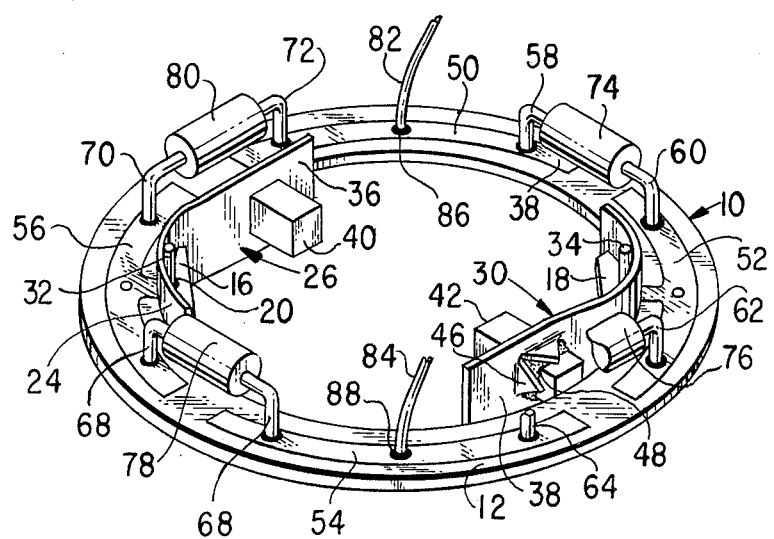
FIG. 3 is a perspective view of the brush board assembly.

The brush board assembly 10 is shown in FIGS. 1 and 2 in association with a rotatable motor armature 94 and with brushes 40 and 42 pressed against the conductive segments 96 of commutator 14 by the free arm portions of springs 26 and 30 respectively. The commutator segments 96 suitably connect with the wires of the armature in a manner well understood. The brush board is held at 100 by the motor casing 102 in a fixed position relative to the rotational axis of the armature. The type of motor wherein the brush is utilized is preferably, but not necessarily, a single air gap motor of the kind disclosed, for example, in U.S. Pat. No. 3,891,876 for "Permanent Magnet-Electric Motor Having a Non-Ferrous Solid Armature" and U.S. Pat. No. 4,063,123 for "Rotor Winding Improvement" issued June 24, 1975 and Dec. 13, 1977, respectively, to John A. Herr and Wolfgang Jaffe; such motors being especially suitable for driving sewing machines, portable tools and other devices where small size, light weight, low cost, high torque-to-inertia ratio, long brush life and freedom from inherent electromagnetic interference are important factors.

Figure 5:
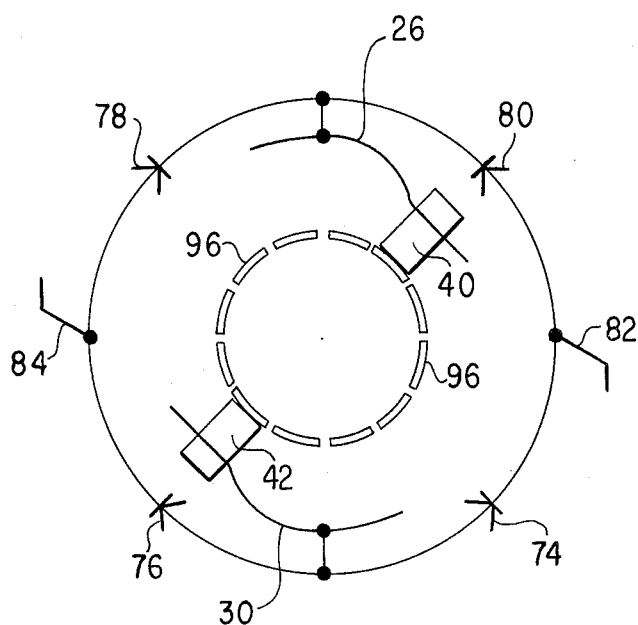
FIG. 5 is a schematic view of circuitry provided on the assembly.

A motor with brush board 10 is controllable by AC voltage signals across the leads 82 and 84 which connect with the circuitry on mounting board 12. As best seen in FIG. 5, such circuitry extending to the brushes through springs 26 and 30 includes the rectifiers 74, 76, 78 and 80 and printed segments 50, 52, 54 and 56 all arranged to define a full wave bridge rectifying circuit.

Other forms of the invention than those described herein are also possible, and it is to be understood that the embodiment disclosed herein is in no way to be construed as a limitation of the invention. Numerous alterations and modifications of the disclosed structures will suggest themselves to those skilled in the art, and all such alterations and modifications which do not depart from the spirit and scope of the invention are intended to be within the scope of the appended claims.

I claim:

1. A brush board asssembly for a dynamoelectric machine comprising a non-conductive mounting board formed as a ring to extend around a commutator and including inwardly projecting portions, printed circuitry on the ring with portions extending onto the projecting portions of the ring where holes pass through the printed circuitry and ring, electrically conductive flat-type springs with slots through which said projecting portions of the ring and printed circuitry extend, electrically conductive pins in said holes and in tight engagement with the springs for securing the springs to the ring and electrically connecting said printed circuitry with the springs, and a commutator engageable brush affixed on each spring.

2. A brush board assembly as defined in claim 1, wherein the brushes are mounted in pierced cavities extending through the springs.

3. A brush board assembly as defined in claim 2, wherein the brushes are secured with an electrically conductive epoxy cement to jagged projections extending about the pierced cavities in the springs.

* * * * *